(12) United States Patent
Baba (10) Patent No.: US 11,952,730 B2
(45) Date of Patent: Apr. 9, 2024

(54) ASPHALT FINISHER AND MANAGEMENT DEVICE FOR ROAD CONSTRUCTION MACHINE

(71) Applicant: SUMITOMO CONSTRUCTION MACHINERY CO., LTD., Tokyo (JP)

(72) Inventor: Nobuyuki Baba, Chiba (JP)

(73) Assignee: SUMITOMO CONSTRUCTION MACHINERY CO., LTD., Tokyo (JP)

(*) Notice: Subject to any disclaimer, the term of this patent is extended or adjusted under 35 U.S.C. 154(b) by 255 days.

(21) Appl. No.: 17/159,409

(22) Filed: Jan. 27, 2021

(65) Prior Publication Data

US 2021/0148064 A1    May 20, 2021

Related U.S. Application Data

(63) Continuation of application No. PCT/JP2019/030041, filed on Jul. 31, 2019.

(30) Foreign Application Priority Data

Aug. 1, 2018 (JP) ................... 2018-145286

(51) Int. Cl.
*E01C 19/48* (2006.01)
*E01C 23/07* (2006.01)

(52) U.S. Cl.
CPC .......... *E01C 19/4873* (2013.01); *E01C 23/07* (2013.01)

(58) Field of Classification Search
CPC .............................. E01C 19/4873; E01C 23/07
USPC .................................................... 404/75–118
See application file for complete search history.

(56) References Cited

U.S. PATENT DOCUMENTS

| 5,309,407 A | 5/1994 | Sehr et al. |
| 5,721,685 A * | 2/1998 | Holland ................. E01C 23/01 701/470 |
| 5,752,783 A * | 5/1998 | Malone ................. G01S 13/88 404/84.2 |
| 5,876,150 A * | 3/1999 | Koleszar ............... E01C 19/008 404/84.2 |

(Continued)

FOREIGN PATENT DOCUMENTS

| JP | H02-309209 | 12/1990 |
| JP | H03-044601 | 7/1991 |

(Continued)

OTHER PUBLICATIONS

International Search Report for PCT/JP2019/030041 dated Oct. 15, 2019.

*Primary Examiner* — Raymond W Addie
(74) *Attorney, Agent, or Firm* — IPUSA, PLLC (57) ABSTRACT

An asphalt finisher includes a tractor, a hopper provided on a front side of the tractor and configured to receive a pavement material, a conveyor configured to supply the pavement material in the hopper to a rear side of the tractor, a screw configured to place and spread the pavement material supplied by the conveyor on a rear side of the tractor, a screed configured to lay and spread the pavement material placed and spread by the screw on a rear side of the screw, and a distance measuring device configured to include a region including a road surface placed and spread by the screed, and a planimetric feature that is used as a reference for a height of the road surface, within a measuring range.

16 Claims, 4 Drawing Sheets

(56) References Cited

U.S. PATENT DOCUMENTS

| | | | | |
|---|---|---|---|---|
| 6,027,282 | A * | 2/2000 | Horn | G01C 15/004 404/75 |
| 7,856,302 | B2 * | 12/2010 | Rasmussen | E01C 19/004 701/50 |
| 9,869,063 | B1 * | 1/2018 | Brenner | E01C 19/00 |
| 9,963,836 | B1 * | 5/2018 | Brenner | G01B 17/06 |
| 2004/0068896 | A1 | 4/2004 | Sehr | |
| 2006/0045620 | A1 | 3/2006 | Olson et al. | |
| 2008/0038059 | A1 * | 2/2008 | Frelich | E01C 23/07 404/75 |
| 2008/0124173 | A1 * | 5/2008 | Buschmann | E01C 19/48 404/101 |
| 2009/0324331 | A1 * | 12/2009 | Glee | E01C 23/07 404/75 |
| 2012/0321386 | A1 * | 12/2012 | Hanfland | E01C 19/48 404/118 |
| 2013/0051913 | A1 | 2/2013 | Eul | |
| 2013/0136539 | A1 * | 5/2013 | Aardema | G01K 1/14 73/862.55 |
| 2015/0275482 | A1 * | 10/2015 | Hill | E02F 3/847 701/50 |
| 2016/0222602 | A1 * | 8/2016 | Downing | E01C 19/004 |
| 2017/0060126 | A1 * | 3/2017 | Marsolek | E01C 19/48 |
| 2017/0204569 | A1 | 7/2017 | Shah et al. | |
| 2017/0226709 | A1 * | 8/2017 | Ali | E01C 19/48 |
| 2017/0241087 | A1 * | 8/2017 | Ellwein | E01C 23/01 |
| 2020/0018634 | A1 * | 1/2020 | Fickeisen | E01C 19/48 |

FOREIGN PATENT DOCUMENTS

| | | | |
|---|---|---|---|
| JP | H04-077610 U | 7/1992 | |
| JP | H04-330106 | 11/1992 | |
| JP | H07-127017 | 5/1995 | |
| JP | H07-043130 U | 8/1995 | |
| JP | H11-325892 | 11/1999 | |
| JP | 2002-339314 | 11/2002 | |
| JP | 3142160 U | 6/2008 | |
| JP | 2013-047454 | 3/2013 | |
| JP | 2017-115387 | 6/2017 | |
| JP | 2018-145286 | 9/2018 | |
| SE | WO 2016198333 A1 * | 12/2016 | E01C 19/48 |

* cited by examiner

ASPHALT FINISHER AND MANAGEMENT DEVICE FOR ROAD CONSTRUCTION MACHINE

CROSS REFERENCE TO RELATED APPLICATIONS

This application is a continuation application of International Application No. PCT/JP2019/030041 filed on Jul. 31, 2019 and designated the U.S., which is based upon and claims priority to Japanese Patent Application No. 2018-145286, filed on Aug. 1, 2018, the entire contents of each of which are hereby incorporated by reference.

BACKGROUND

1. Technical Field

The present disclosure relates to asphalt finishers, and management devices for road construction machines.

2. Description of the Related Art

In related art, a finished work quality of a road surface formed by an asphalt finisher is measured using a leveling string which is stretched to straddle over the road surface in a road width direction and a measure, with reference to a height of curbstones on both sides of the road surface.

However, stretching the leveling string requires a troublesome operation. For this reason, it is desirable to provide an asphalt finisher which can more easily measure the finished work quality of the road surface.

SUMMARY

An asphalt finisher according to one aspect of the embodiments includes a tractor; a hopper, provided on a front side of the tractor, and configured to receive a pavement material; a conveyor configured to supply the pavement material in the hopper to a rear side of the tractor; a screw configured to place and spread the pavement material supplied by the conveyor on a rear side of the tractor; a screed configured to lay and spread the pavement material placed and spread by the screw on a rear side of the screw; and a distance measuring device having a measuring range which includes a region including a road surface placed and spread by the screed, and a planimetric feature that is used as a reference for a height of the road surface.

A management device for a road construction machine according to another aspect of the embodiments is configured to receive results of measurements made by a distance measuring device which is attached to the road construction machine and has a measuring range which includes a region including a planimetric feature that is used as a reference for a height of a road surface.

Other objects and further features of the present invention will be apparent from the following detailed description when read in conjunction with the accompanying drawings.

DETAILED DESCRIPTION

Figure 1:
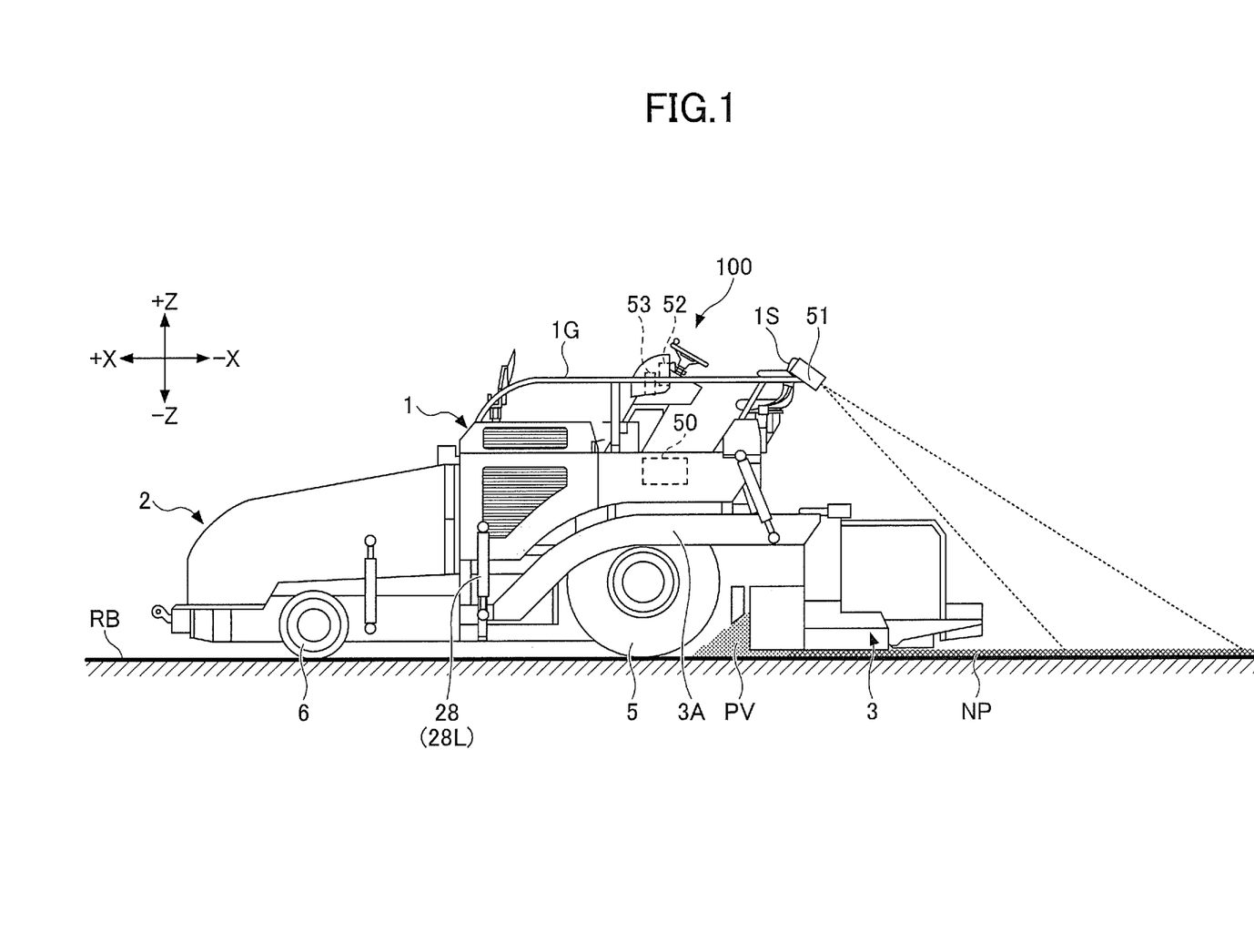
FIG. 1 is a side view of an asphalt finisher according to an embodiment of the present invention.
Figure 2:
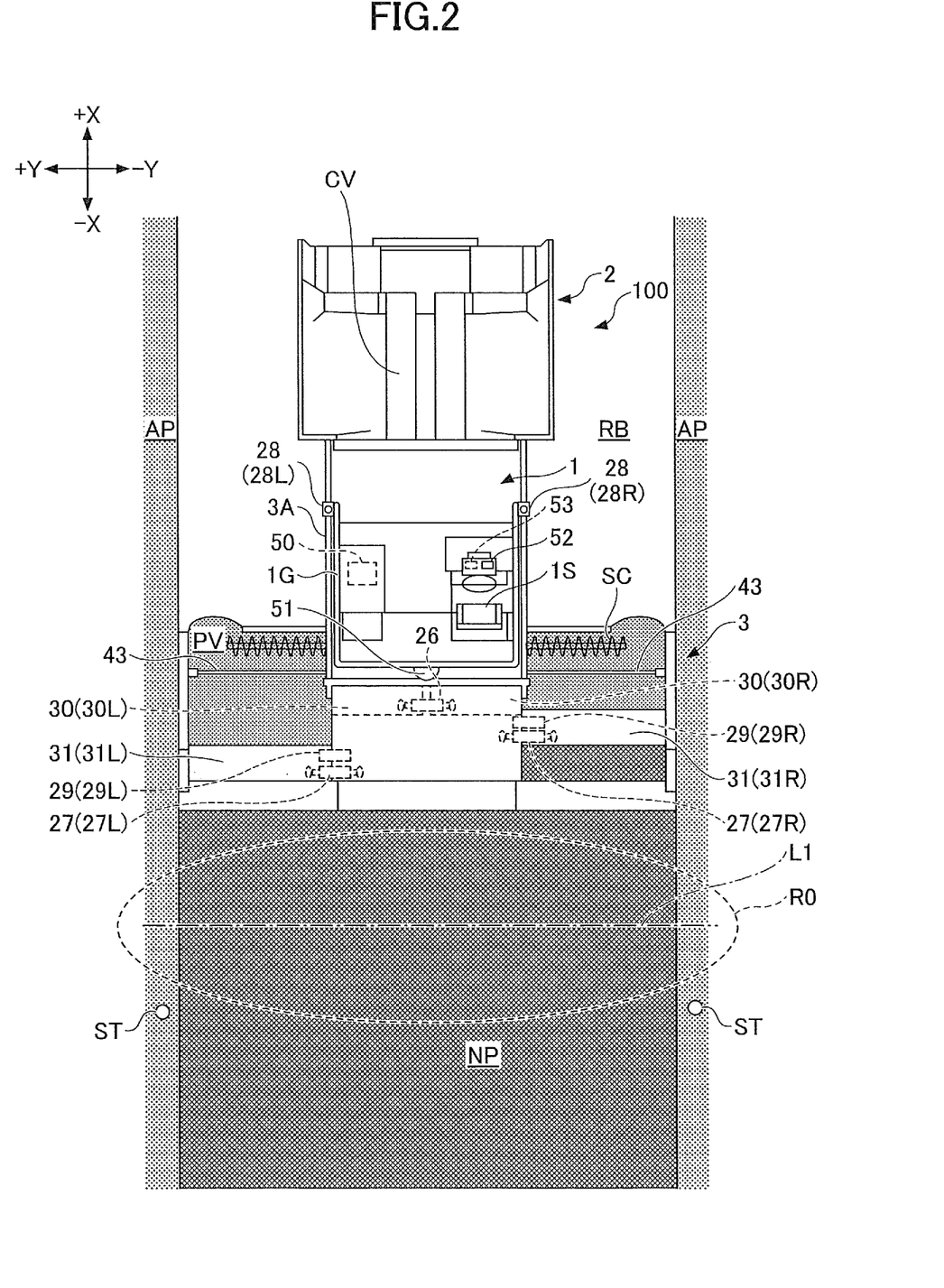
FIG. 2 is a top view of the asphalt finisher.

FIG. 1 is a side view of an asphalt finisher 100, which is an example of a road construction machine according to an embodiment of the present invention. FIG. 2 is a top view of the asphalt finisher 100. The asphalt finisher 100 mainly includes a tractor 1, a hopper 2, and a screed 3. Hereinafter, a direction of the hopper 2 viewed from the tractor 1 is regarded as a front direction (+X-direction), and a direction of the screed 3 viewed from the tractor 1 is regarded as a rear direction (−X-direction). The road machine may be a tack paver, a multi-asphalt paver, or the like.

The tractor 1 is a mechanism for driving the asphalt finisher 100. In this embodiment, the tractor 1 rotates a rear wheel 5 using a rear wheel driving hydraulic motor, and rotates a front wheel 6 using a front wheel driving hydraulic motor, to move the asphalt finisher 100. The rear wheel driving hydraulic motor and the front wheel driving hydraulic motor rotate in response to receiving hydraulic oil from a hydraulic pump. The rear wheel 5 and the front wheel 6 may be replaced by crawlers.

A controller 50 is a control device that controls the asphalt finisher 100. In this embodiment, the controller 50 is formed of a microcomputer including a CPU, a memory, a non-volatile storage device, or the like, and is mounted on the tractor 1. Each of functional elements of the controller 50 is realized by executing a program stored in the non-volatile storage device by the CPU. However, each of the functional elements of the controller 50 may be implemented by hardware or software.

The hopper 2 is a mechanism for receiving a pavement material. In this embodiment, the hopper 2 is provided on the front side of the tractor 1, and is configured to be able to open and close in a Y-axis direction (vehicle width direction) by a hopper cylinder. The asphalt finisher 100 typically receives the pavement material (for example, an asphalt mixture) from a dump truck bed with the hopper 2 in a fully open state. FIG. 1 and FIG. 2 illustrate the fully open state of the hopper 2. As the pavement material in the hopper 2 decreases, the hopper 2 is closed, and the pavement material near an inner wall of the hopper 2 is collected to a center portion of the hopper 2, so as to enable a conveyor CV at the center portion of the hopper 2 to supply the pavement material to the rear side of the tractor 1. In addition, the pavement material supplied to the rear side of the tractor 1 is laid and spread in the vehicle width direction by a screw SC, on the rear side of the tractor 1 and on the front side of the screed 3. In this embodiment, the screw SC is in a state having extension screws connected to left and right sides thereof. FIG. 1 and FIG. 2 illustrate a pavement material PV, that is laid and spread by the screw SC, by a dot pattern.

The screed 3 is a mechanism for placing and spreading the pavement material PV. In this embodiment, the screed 3 includes a front screed 30 and a rear screed 31. The front screed 30 includes a left front screed 30L, and a right front screed 30R. The rear screed 31 includes a left rear screed 31L, and a right rear screed 31R. The screed 3 is a floating screed towed by tractor 1, and is connected to the tractor 1 via a leveling arm 3A.

A moldboard 43 is attached to the front of the screed 3. The moldboard 43 is configured to be able to adjust the amount of pavement material PV stagnant in front of the screed 3. The pavement material PV passes through a gap between a lower end of the moldboard 43 and a roadbed RB and under the screed 3.

A center crowing attachment 26 is attached to the front screed 30. The center crowing attachment 26 is a mechanism for extending and contracting a length of a turnbuckle attached between the left front screed 30L and the right front screed 30R, to adjust an angle between a lower surface of the left front screed 30L and a lower surface of the right front screed 30R when viewed from the rear. More particularly, the center crowing attachment 26 rotates a body of the turnbuckle to extend and contract the length of the turnbuckle, by rotating a hydraulic motor in response to a control command from the controller 50.

A slope crowing attachment 27 is attached between the front screed 30 and the rear screed 31. The slope crowing attachment 27 includes a left slope crowing attachment 27L, and a right slope crowing attachment 27R. More particularly, the left slope crowing attachment 27L is attached between the left front screed 30L and the left rear screed 31L, and the right slope crowing attachment 27R is attached between the right front screed 30R and the right rear screed 31R.

The left slope crowing attachment 27L is a mechanism for extending and contracting a length of a turnbuckle attached between the left front screed 30L and the left rear screed 31L, to adjust an angle between the lower surface of the left front screed 30L and a lower surface of the left rear screed 31L when viewed from the rear. More particularly, the left slope crowing attachment 27L rotates a body of the turnbuckle to extend and contract the length of the turnbuckle, by rotating a hydraulic motor in response to a control command from the controller 50. The same applies to the right slope crowing attachment 27R.

A guide rail 1G, which may be used as a handrail by an operator of the asphalt finisher 100, is provided at an upper portion of the tractor 1. A distance measuring device 51 is mounted on the guide rail 1G. The distance measuring device 51 may be mounted to a lower portion of a driver's seat 1S, or at other portions of the asphalt finisher 100.

The distance measuring device 51 is configured to measure a distance to an object located in a periphery of the asphalt finisher 100. In this embodiment, the distance measuring device 51 is a LIDAR having a space on the rear of the screed 3 as a measuring range thereof. The measuring range desirably has a width greater than the width of a new pavement NP. In this embodiment, the measuring range includes a curbstone as a planimetric feature AP outside the new pavement NP. The planimetric feature AP may be a feature other than the curbstone, such as a gutter or the like, as long as the feature that can be used as a reference for the height of the surface of the new pavement NP. The LIDAR measures the distance between the LIDAR and one million or more points within the measuring range, for example. A range indicated by a dashed line in FIG. 1 and FIG. 2 represents a measuring range R0 of the distance measuring device 51.

The distance measuring device 51 desirably includes an inertial measurement unit, so as to measure an attitude of the distance measuring device 51. The inertial measurement unit is a combination of an acceleration sensor and a gyro sensor, for example. In addition, the distance measuring device 51 desirably includes a positioning device, so as to measure a position of the distance measuring device 51. The positioning device is a GNSS receiver, for example.

The distance measuring device 51 may be a stereo camera, a millimeter wave radar, a laser radar, a laser scanner, a distance imaging camera, a laser range finder, or the like.

The distance measuring device 51 may be arranged in a space within the width of the tractor 1. The distance measuring device 51 may perform the measurement along the left rear screed 31L and the right rear screed 31R. The distance measuring device 51 may perform the measurement with reference to the planimetric feature AP outside the new pavement NP.

In this embodiment, a single distance measuring device 51 is attached to the asphalt finisher 100, however, a plurality of distance measuring devices 51 may be attached to the asphalt finisher 100.

A display device 52 is configured to display information related to the asphalt finisher 100. In this embodiment, the display device 52 is a liquid crystal display provided in front of the driver's seat 1S.

A communication device 53 is configured to control communication between the asphalt finisher 100 and a device external to the asphalt finisher 100. In this embodiment, the communication device 53 is provided in front of the driver's seat 1S.

Figure 3:
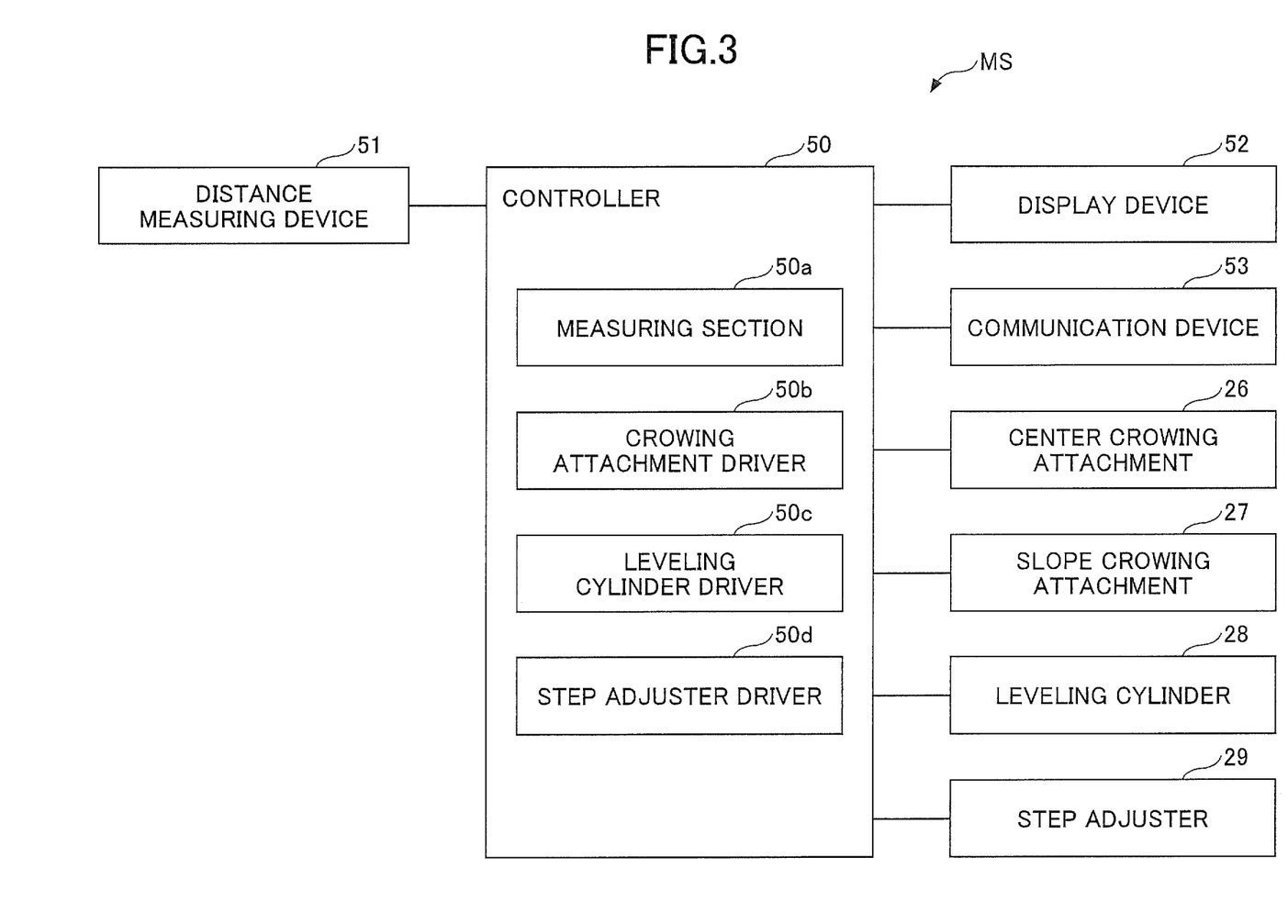
FIG. 3 is a block diagram illustrating an example of a configuration of a measurement system.
Figure 4:
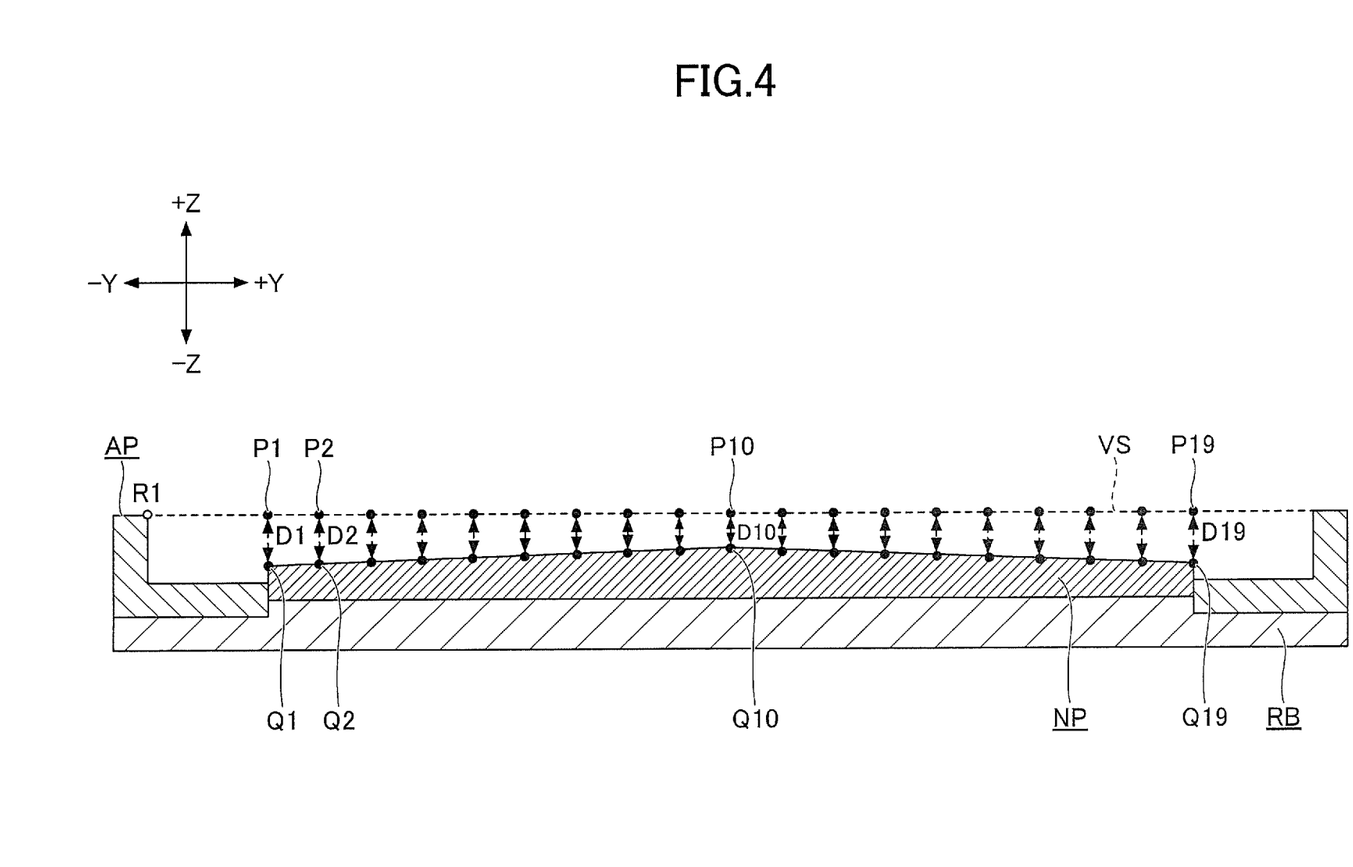
FIG. 4 is a cross sectional view of a new pavement.

Next, a measurement system MS provided in the asphalt finisher 100 will be described, by referring to FIG. 3 and FIG. 4. FIG. 3 is a block diagram illustrating an example of a configuration of the measurement system MS. FIG. 4 is a cross sectional view of the new pavement NP formed by the asphalt finisher 100, and illustrates a state where a vertical cross section including a one-dot chain line L1 in FIG. 2 is viewed from the +X side.

The measurement system MS mainly includes the center crowing attachment 26, the slope crowing attachment 27, a leveling cylinder 28, a step adjuster 29, the controller 50, the distance measuring device 51, the display device 52, and the communication device 53.

The controller 50 includes a measuring section 50a, a crowing attachment driver 50b, a leveling cylinder driver 50c, and a step adjuster driver 50d, as functional elements thereof.

The measuring section 50a is configured to measure finished work quality of a surface of the new pavement NP formed by the asphalt finisher 100. In this embodiment, the measuring section 50a measures the finished work quality of the surface of the new pavement NP within the measuring range R0, based on an output of the LIDAR which is used as the distance measuring device 51. More particularly, the measuring section 50a measures the finished work quality of the surface of the new pavement NP using a local coordinate system centered on the LIDAR which is used as the distance measuring device 51, and a reference coordinate system. In other words, the measuring section 50a transforms coordinates in the local coordinate system into coordinates in the reference coordinate system, thereby specifying each coordinate in the reference coordinate system corresponding to each point on the surface of the new pavement NP. The reference coordinate system is a world geodetic system, for example. The world geodetic system is a three-dimensional orthogonal XYZ coordinate system having an origin at a center of gravity of the earth, an X-axis in a direction of an intersection of the Greenwich meridian and the equator, a Y-axis in a direction of 90 degrees east longitude, and a Z-axis in a direction of the north pole.

The measuring section 50a may measure the finished work quality of the surface of the new pavement NP within the measuring range R0 during construction, that is, while the asphalt finisher 100 moves frontward, or may measure the finished work quality of the surface of the new pavement NP within the measuring range R0 after construction, that is, after the asphalt finisher 100 stops moving.

First, the measuring section 50a sets a point on the planimetric feature AP outside the new pavement NP in the width direction, as a reference point R1. In this embodiment, the reference point R1 is set at an upper end of an L-shaped curbstone partitioning the new pavement NP. However, the planimetric feature AP may be a wooden frame that is used to partition the new pavement NP, or a stylobate ST (refer to FIG. 2) that is used to stretch the leveling string to measure the finished work quality according to the related art. The stylobate ST is provided by workers when measuring the finished work quality of the surface of the new pavement NP, for example. In addition, the measuring section 50a may use, as the reference point R1, an air point that is not on the planimetric feature AP, such as a point that is at a predetermined height vertically above the upper end of the curbstone, or the like.

More particularly, the measuring section 50a detects the curbstone based on the output of the LIDAR, and sets the upper end of the curbstone at a position separated by a predetermined distance from the rear end of the asphalt finisher 100 in the −X-direction, as the reference point R1.

The measuring section 50a may detect the stylobate ST having a predetermined shape (for example, a cylindrical shape) based on the output of the LIDAR, and set a center point (center of an upper surface) of the stylobate ST, as the reference point R1.

Thereafter, the measuring section 50a sets a line parallel to the width direction (Y-axis direction) of the new pavement NP and passing through the reference point R1, as a virtual leveling string VS. The virtual leveling string VS is typically a horizontal line passing through the reference point R1.

However, the measuring section 50a may set a line connecting a center point of a stylobate ST on the +Y-side of the new pavement NP and a center point of a stylobate ST on the −Y-side of the new pavement NP, as the virtual leveling string VS.

Thereafter, the measuring section 50a derives a vertical distance between the virtual leveling string VS and the surface of the new pavement NP. In this embodiment, as illustrated in FIG. 4, the measuring section 50a sets 19 points P1 through P19, which are equally spaced, on the virtual leveling string VS. Then, the measuring section 50a identifies points Q1 through Q19 on the surface of the new pavement NP, located directly below the points P1 through P19, respectively. For the sake of clarification, FIG. 4 omits illustration of reference numerals and leader lines corresponding to the points P3 through P9, the points P11 through P18, the points Q3 through Q9, and the points Q11 through Q18, respectively. More particularly, the measuring section 50a identifies the points Q1 through Q19 based on the distance between the distance measuring device 51 and each point on the surface of the new pavement NP, and the attitude of the distance measuring device 51. The attitude of the distance measuring device 51 is based on the output of the inertial measurement unit, for example.

Thereafter, the measuring section 50a computes a distance D1 between the point P1 and the point Q1. In this embodiment, the measuring section 50a computes the distance D1, based on the distance between the point P1 and the distance measuring device 51, and the distance between the point Q1 and the distance measuring device 51, output from the distance measuring device 51. The same applies to computing of distances D2 through D19. The measuring section 50a may compute a thickness of the new pavement NP corresponding to each of the distances D1 through D19, respectively, based on the height of the roadbed RB derived from the reference point R1. For the sake of clarification, FIG. 4 omits illustration of the reference numerals corresponding to the distances D3 through D9, and the distances D11 through D18.

The points set on the virtual leveling string VS may be unequally spaced. In addition, the number of points set on the virtual leveling string VS may be less than 19, or may be 20 or more.

Thereafter, the measuring section 50a displays measurement results of distances D1 through D19 on the display device 52. In this embodiment, the measuring section 50a displays the measurement results of the distances D1 through D19 on the display device 52 using a diagram. However, the measuring section 50a may display the measurement results of the distances D1 through D19 using only numerical values, or display the measurement results by a combination of the diagram and the numerical values.

In this embodiment, the measuring section 50a is configured to store the measurement results of the distances D1 through D19 in the non-volatile storage device, in a manner related to position information. The position information may include information related to the latitude and the longitude, for example. The position information may include information related to the height or altitude. The position information is generated based on the output of the positioning device included in the distance measuring device 51, for example.

Moreover, the measuring section 50a may transmit the measurement results of the distances D1 through D19 to an external device. For example, the measuring section 50a may transmit the measurement results to a management device, such as a computer or the like provided in an external management center or the like, or to a support device, such as a smartphone or the like carried by the workers, to display the same information as that displayed on the display device 52 on a display device of the management device or the support device. The management device may be configured to store the received measurement results in correspondence with an execution scheme drawing. Information related to the execution scheme drawing is prestored in a non-volatile storage device of the management device, for example. In this case, the management device may superimpose the information related to the measurement results on the execution scheme drawing displayed on the display device. In addition, the management device may be configured to store the received measurement results in correspondence with map information. The map information includes a map image, for example, and is prestored in the non-volatile storage device of the management device. In this case, the management device may superimpose the information related to the measurement results on the map image displayed on the display device. The same applies to the support device.

Alternatively, the measuring section 50a may transmit the measurement results of the distances D1 through D19 with respect to a road roller for compacting the new pavement NP. In this case, an operator of the road roller which receives the measurement results of the distances D1 through D19 may change a driving path of the road roller according to the measurement results displayed on a display device of the road roller, for example. Moreover, the measuring section 50a may transmit the measurement results and the position information to at least one of the management device, the support device, and the road roller.

The measuring section 50a may compute a difference between the distance D1 and an ideal distance D1T corresponding to the distance D1, as a size of irregularities on the surface of the new pavement NP, and output the size of the irregularities as the measurement results. The ideal distance D1T is prestored in the non-volatile storage device, for example. If distance D1 coincides with the ideal distance D1T, the height of the point on the surface of the new pavement NP corresponding to distance D1 is equal to the reference height determined by the planimetric feature AP. The same applies to the distances D2 through D19. In this case, the measuring section 50a may display the size of the irregularities corresponding to each of the distances D1 through D19 on the display device 52, together with the measurement results of the distances D1 through D19. Alternatively, the measuring section 50a may display the size of the irregularities corresponding to each of the distances D1 through D19 on the display device 52, in place of the measurement results of the distances D1 through D19.

In a case where the size of the irregularities on the surface of the new pavement NP exceeds a predetermined value, the measuring section 50a may display this information on the display device 52. In this case, the measuring section 50a may output an alarm from a voice output device which is not illustrated.

The controller 50 may display an image acquired by a camera (not illustrated) which is attached to the asphalt finisher 100 at the rear of the asphalt finisher 100, on the display device 52. The measuring section 50a may superimpose the information related to the measurement results of the distances D1 through D19 on the image acquired by the camera. In this case, the information related to the measurement results of the distances D1 through D19 may be numerical values, graphics, or the like representing the size of the irregularities.

In a case where the finished work quality of the surface of the new pavement NP is continuously measured in a moving direction (X-axis direction) of the asphalt finisher 100, the measuring section 50a may display, on the display device 52, a diagram representing a distribution of the size of the surface irregularities. In this diagram, a concave portion is represented by a red color, and a convex portion is represented by a blue color, in a state viewed from directly above the new pavement NP, for example.

The crowing attachment driver 50b is configured to drive at least one of the center crowing attachment 26 and the slope crowing attachment 27. In this embodiment, the crowing attachment driver 50b separately operates the center crowing attachment 26 and the slope crowing attachment 27, using hydraulic pumps, hydraulic motors, controls valve, or the like. More particularly, the crowing attachment driver 50b operates the center crowing attachment 26 and the slope crowing attachment 27 separately, in response to commands from the operator of the asphalt finisher 100 received via an input device which is not illustrated. The crowing attachment driver 50b may operate the center crowing attachment 26 and the slope crowing attachment 27 separately, in response to control commands from the controller 50, in addition to the commands from the operator.

The leveling cylinder driver 50c is configured to drive the leveling cylinder 28. The leveling cylinder 28 (refer to FIG. 1 and FIG. 2) is a hydraulic cylinder which moves the front end portion of the leveling arm 3A up and down to adjust the thickness of the asphalt mixture that is placed and spread. In this embodiment, the leveling cylinder 28 includes a left leveling cylinder 28L, and a right leveling cylinder 28R. The leveling cylinder driver 50c operates the leveling cylinder 28 using a hydraulic pump, a control valve, or the like. More particularly, the leveling cylinder driver 50c operates the leveling cylinder 28 in response to a command from the operator of the asphalt finisher 100 received via the input device. The leveling cylinder driver 50c may operate the leveling cylinder 28 in response to a control command from the controller 50, independent of the command by the operator.

The step adjuster driver 50d is configured to drive the step adjuster 29. The step adjuster 29 (refer to FIG. 2) is a mechanism for moving the rear screed 31 up and down in order to eliminate a step formed between a pavement surface formed by the front screed 30 and a pavement surface formed by the rear screed 31. In this embodiment, the step adjuster 29 rotates a step adjusting motor, as the hydraulic actuator, in response to a control command from the controller 50, and drives a rotation-to-direct action conversion mechanism attached to the rear screed 31, to moves the rear screed 31 up and down with respect to the front screed 30. The step adjuster 29 includes a left step adjuster 29L for moving the left rear screed 31L up and down, and a right step adjuster 29R for moving the right rear screed 31R up and down. The step adjuster driver 50d operates the step adjuster 29 using hydraulic pumps, hydraulic motors, control valves, or the like. More particularly, the step adjuster driving unit 50d operates the step adjuster 29 in response to a command from the operator of the asphalt finisher 100 received via the input device. The step adjuster driver 50d may operate the step adjuster 29 in response to a control command from the controller 50, independent of the command from the operator.

For example, the operator monitoring the measurement results of the distances D1 through D19 displayed on the display device 52 may operate the center crowing attachment 26 via the input device and the crowing attachment driver 50b, to adjust the angle between the lower surface of the left front screed 30L and the lower surface of the right front screed 30R when viewed from the rear.

The controller 50 may output the control command to the crowing attachment driver 50b in a case where the controller detects that the thickness of the left portion (+Y-side portion) of the new pavement NP famed by the left rear screed 31L increases toward the outside, for example. In this case, the crowing attachment driver 50b performs the adjustment by the left slope crowing attachment 27L in response to the control command from the controller 50.

The operator monitoring the measurement results of the distances D1 through D19 may not only operate the center crowing attachment 26 or the slope crowing attachment 27, but also operate the leveling cylinder 28 via the leveling cylinder driver 50c, in order to adjust the thickness of the new pavement NP, because when adjusting the thickness of the new pavement NP, the adjustment made by the leveling cylinder is more effective than the adjustments made by the center crowing attachment 26 and the slope crowing attachment.

The same applies to a case where the controller 50 detects that a step is formed between the portion formed by the left front screed 30L and the portion formed by the left rear screed 31L. In this case, the controller 50 may output the control command to the step adjuster driver 50d. The step adjuster driver 50d operates the step adjuster 29 in response to the control command from the controller 50, so as to eliminate the step.

Although the width of the adjustment by at least one of the center crowing attachment 26, the slope crowing attachment 27, the leveling cylinder 28, and the step adjuster 29 is automatically determined in the example described above, the operator may manually determine the width of the adjustment by at least one of the center crowing attachment 26, the slope crowing attachment 27, the leveling cylinder 28, and the step adjuster 29 while checking contents displayed on the display device 52.

As described above, the asphalt finisher 100 according to the embodiment of the present invention includes the tractor 1, the hopper 2 provided on the front side of the tractor 1 for receiving the pavement material PV, the conveyor CV for supplying the pavement material PV in the hopper 2 to the rear side of the tractor 1, the screw SC for laying and spreading the pavement material PV supplied by the conveyor CV on the rear side of the tractor 1, the screed 3 for placing and spreading the pavement material PV laid and spread by the screw SC on the rear side of the screw SC, and the distance measuring device 51 which includes a region including the surface of the new pavement NP that is the road surface placed and spread by the screed 3 and the planimetric feature AP that is used as the reference for the height of the road surface, within the measuring range R0.

According to this configuration, the asphalt finisher 100 can more easily measure the finished work quality of the surface of the new pavement NPs, because there is no need to stretch the leveling string as in the related art. For the same reasons, the asphalt finisher 100 can shorten the time required to measure the finished work quality of the surface of the new pavement NP. Further, because the asphalt finisher 100 can reduce human errors during the measurement, it is possible to increase the accuracy of the measurement. Moreover, the asphalt finisher 100 can improve the safety of the workers measuring the finished work quality of the surface, because unlike the related art, the workers do not need to enter the area of the new pavement NP in the high-temperature state immediately after being placed and spread. In addition, the asphalt finisher 100 can prevent the surface of the new pavement NP from being damaged by the workers entering the area of the new pavement NP.

The distance measuring device 51 can be provided on the tractor 1. According to this configuration, the asphalt finisher 100 can further increase the accuracy of measuring the finished work quality of the surface of the new pavement NP, because the tractor 1 is subject to less vibration than the screed 3. In addition, the distance measuring device 51 can measure the distance to the surface of the new pavement NP with a relatively large dip angle compared to a case where the distance measuring device 51 is provided on the screed 3, for example.

The asphalt finisher 100 desirably includes the controller 50 which computes the irregularities of the road surface with respect to the reference height determined by the planimetric feature AP, based on the output of the distance measuring device 51. According to this configuration, the asphalt finisher 100 can easily measure, by itself, the finished work quality of the surface of the new pavement NP, without connecting to other devices. The distance measuring device 51 may also be utilized to implement other functions, such as rear monitoring or the like. In addition, the operator of the asphalt finisher 100 can intuitively grasp the state of the finished work quality of the surface of the new pavement NP by monitoring the information related to the irregularities on the surface of the new pavement NP with respect to the reference height.

The asphalt finisher 100 is desirably connected to the display device for displaying the results of measurements made by the distance measuring device 51. The display device includes the display device 52 provided in the asphalt finisher 100, the display device of the management device, such as the computer or the like provided in the external management center or the like, or the display device of the support device, such as the smartphone or the like carried by the workers. According to this configuration, the asphalt finisher 100 can communicate the information related to the shape of the surface of the new pavement NP to the operator of the asphalt finisher 100, or to people concerned, such as the workers working in the periphery of the asphalt finisher 100.

Each of the embodiments can provide an asphalt finisher which can more easily measure the finished work quality of the road surface.

Desirable embodiments of the invention are described above. However, the present invention is not limited to the embodiments described above. Various modifications, substitutions, or the like may be applied to the embodiments described above without departing from the scope of the present invention. In addition, each of the features described with reference to the embodiments described above may also be suitably combined, unless technically contradictory.

For example, in the embodiments described above, the distance measuring device 51 is attached to the guide rail 1G, but may be attached at a higher position, such as at an upper portion of a canopy, to enable measurement of the distance to the surface of the new pavement NP with a larger dip angle.

What is claimed is:

1. An asphalt finisher comprising:
   a tractor having a width along a width direction thereof;
   a hopper, provided on a front side of the tractor, and configured to receive a pavement material;
   a conveyor configured to supply the pavement material in the hopper to a rear side of the tractor;
   a screw configured to place and spread the pavement material supplied by the conveyor on a rear side of the tractor;
   a screed configured to lay and spread the pavement material placed and spread by the screw on a rear side of the screw; and
   a distance measuring device, configured to perform measurements at a plurality of positions along the width direction within a measuring range which includes a region on a rear side of the screed and including a road surface placed and spread by the screed, and a planimetric feature that is located at a position outside the road surface along the width direction and is used as a reference height for a height of the road surface, wherein the distance measuring device includes a sensor configured to measure both the road surface and the planimetric feature; and
   a controller configured to compute irregularities at the plurality of positions on the road surface with respect to the reference height determined by the planimetric feature, based on an output of the distance measuring device, and measure a finished work quality of the road surface placed and spread by the screed, based on the computed irregularities.

2. The asphalt finisher as claimed in claim 1, wherein the distance measuring device is attached to the tractor.

3. The asphalt finisher as claimed in claim 1, wherein the planimetric feature is a curbstone or a gutter.

4. The asphalt finisher as claimed in claim 1, wherein the controller is coupled to a display device, and is configured to display results of measurements made by the distance measuring device on the display device.

5. The asphalt finisher as claimed in claim 1, further comprising:
a communication device,
wherein the controller is configured to transmit results of measurements made by the distance measuring device to an external device via the communication device.

6. The asphalt finisher as claimed in claim 1, wherein
the screed includes a left rear screed and a right rear screed, and
the distance measuring device performs a measurement along the left rear screed and the right rear screed.

7. The asphalt finisher as claimed in claim 1, wherein the width direction is approximately perpendicular to a moving direction of the asphalt finisher.

8. The asphalt finisher as claimed in claim 1, wherein the controller is coupled to a display device, and is configured to display results of measurements made by the distance measuring device on the display device, based on an output of the distance measuring device.

9. The asphalt finisher as claimed in claim 8, further comprising:
a communication device,
wherein the controller is configured to transmit, via the communication device, the results of the measurements made by the distance measuring device to the external device selected from a group consisting of a management device, a support device, and a road roller.

10. The asphalt finisher as claimed in claim 1, wherein the distance measuring device is arranged in a space within a width of the tractor.

11. The asphalt finisher as claimed in claim 1, wherein the sensor of the distance measuring device is selected from a group consisting of a LIDAR, a stereo camera, a millimeter wave radar, a laser radar, a laser scanner, a distance imaging camera, and a laser range finder.

12. A management device for a road construction machine, configured to
receive results of measurements made by a distance measuring device which is attached to the road construction machine and is configured to perform measurements at a plurality of positions along a width direction of the road construction machine within a measuring range which includes a region including a road surface, and a planimetric feature that is located at a position outside the road surface along the width direction and is used as a reference height for a height of the road surface, wherein the distance measuring device includes a sensor configured to measure both the road surface and the planimetric feature,
receive irregularities at the plurality of positions on the road surface with respect to the reference height determined by the planimetric feature, computed by a controller of the road construction machine based on an output of the distance measuring device, and a finished work quality of the road surface measured by the controller based on the computed irregularities, and
store the received results of the measurements, the received irregularities, and the finished work quality in a storage device of the management device.

13. The management device as claimed in claim 12, configured to display, on a display device, the received results of the measurements in correspondence with position information of the distance measuring device.

14. The management device as claimed in claim 12, wherein the width direction is approximately perpendicular to a moving direction of the road construction machine.

15. The management device as claimed in claim 12, wherein the sensor of the distance measuring device is selected from a group consisting of a LIDAR, a stereo camera, a millimeter wave radar, a laser radar, a laser scanner, a distance imaging camera, and a laser range finder.

16. The management device as claimed in claim 12, wherein the planimetric feature is a curbstone or a gutter.

* * * * *